United States Patent [19]

Tobagi et al.

[11] Patent Number: 5,381,413
[45] Date of Patent: Jan. 10, 1995

[54] DATA THROTTLING SYSTEM FOR A COMMUNICATIONS NETWORK

[75] Inventors: Fouad A. Tobagi, Los Altos; Randall B. Baird, San Jose, both of Calif.

[73] Assignee: Starlight Networks, Mountain View, Calif.

[21] Appl. No.: 996,912

[22] Filed: Dec. 28, 1992

[51] Int. Cl.⁶ .............................................. H04L 12/28
[52] U.S. Cl. .................................. 370/85.6; 370/85.7; 370/94.1
[58] Field of Search ............................. 270/85.1-85.8, 270/85.12, 85.13, 94.1, 85.15; 340/825.5, 825.51, 825.07, 825.08, 825.05

[56] References Cited

U.S. PATENT DOCUMENTS

| | | | |
|---|---|---|---|
| 4,385,382 | 5/1983 | Goss et al. | 370/85.8 |
| 4,459,588 | 7/1984 | Grow | 370/85.6 |
| 4,766,591 | 8/1988 | Huang | 370/85.6 |
| 4,930,121 | 5/1990 | Shiobara | 370/85.4 |
| 4,993,025 | 2/1991 | Vesel et al. | 370/85.4 |
| 5,051,986 | 9/1991 | Grow et al. | 370/85.5 |
| 5,068,849 | 11/1991 | Tanaka | 370/85.5 |
| 5,119,374 | 6/1992 | Firoozmand et al. | 370/85.6 |
| 5,155,725 | 10/1992 | Khalil | 370/85.6 |

*Primary Examiner*—Douglas W. Olms
*Assistant Examiner*—Chau T. Nguyen
*Attorney, Agent, or Firm*—Meltzer, Lippe, Goldstein, Wolf, Schlissel & Sazer

[57] ABSTRACT

A station is provided which is connected to a network segment via a shared transmission medium. The station includes one or more protocol stacks for processing each type of data packet which the station may transmit to or receive from the shared transmission medium. A queue is associated with each protocol for storing corresponding data packets. The station is also provided with a media access controller, which is unable to differentiate among the different types of data packets. The media access controller is provided for enabling data packets of the different types stored in the queues to access the transmission medium with arbitrary priority. A throttler is also provided for controlling the submission of data packets from the queues to the media access controller, depending on the type of the data packets, to provide an appropriate amount of bandwidth in, and to limit the access delay of, a particular type of data packets in the shared transmission medium.

37 Claims, 3 Drawing Sheets

DATA THROTTLING SYSTEM FOR A COMMUNICATIONS NETWORK

RELATED APPLICATIONS

The following patent applications are related to the subject matter of the present application and are assigned to the assignee hereof:

1. U.S. patent application Ser. No. 07/903,855, entitled "A Process for Fair and Prioritized Access to Limited Output Buffers in a Multiport Switch," filed for Fouad A. Tobagi, Joseph M. Gang, Jr. and Allen B. Goodrich on Jun. 25, 1992, now abandoned;

2. U.S. patent application Ser. No. 07/992,897, entitled "Bandwidth Allocation in a Shared Transmission Channel Employing CSMA/CD," filed for Fouad A. Tobagi, Joseph M. Gang, Jr. and Bruce Louis Lieberman on Dec. 18, 1992.

The above applications are incorporated herein by reference.

FIELD OF THE INVENTION

The present invention relates to a system for allocating bandwidth in a shared transmission medium between different types of data, e.g., stream oriented data, such as video or audio data, and bursty data, such as transactional data. In particular, the present invention relates to selectively controlling the submission of data packets to a standard network interface circuit, such as an Ethernet card, which, itself, is unable to differentiate between different types of data. By selectively controlling the submission of data packets, bandwidth may be allocated to different types of data, e.g., video or audio data on the one hand and transactional data on the other hand. This permits the station to transmit and receive video or audio data in a continuous and timely fashion.

BACKGROUND OF THE INVENTION

The demand for networked digital audiovisual systems is expected to grow over the next few years, as business, government and other institutions increasingly turn to digital networks to distribute audiovisual information for education, presentations and reference applications. These customers expect systems that will allow a number of people to be able to view audiovisual information from a server simultaneously, while fully retaining their other network functions. For example, in business computing, most of the major productivity software developers see networked video as an effective means of training and supporting users. Many of these developers have begun including VHS videotapes for training with their software. Now they want to take this a step further by linking the video directly to their software's on-line help resources. Centralizing that support in a video server reduces the cost for customers with many users and ensures that it is properly maintained by the responsible persons.

Networked video presentation systems in business can allow corporate resources, such as sales videos, employee information, and video-based training to be available immediately to all employees from their desks. Similarly, networked video documentation systems will allow institutions of all kinds to maintain multi-user audiovisual databases. One large population of users of such systems are likely to be health care institutions which have extensive audiovisual records. In addition, such databases can be used for on-the-job reference such as revisiting a complex procedure on the manufacturing floor, or creating an on-line archive of TV commercials for an advertising agency.

Audiovisual communication including video conferencing, video mail, and collaborative work, is yet another fast growing business application which requires the support of networked video over Local Area Networks.

The characteristics of video data traffic differ substantially from those of traditional transactional data traffic to the point that Local Area Networks designed primarily to support transactional data applications are not appropriate to effectively support video services. With transactional data applications, the data rate associated with a traffic source is highly variable. Transactional data is typically transmitted in bursts. Thus, the data rate exhibits a high peak to average ratio. Accordingly, the design of Local Area Networks aimed at supporting data applications has been based on the principle of bandwidth sharing and statistical time multiplexing. In contrast, the data rate associated with the transmission of a video stream is relatively constant; the precise value depends on the particular encoding scheme used and the image quality desired, but it tends to be much higher than the average rate associated with a transactional data source. In particular, CCITT recommendation H.261 specifies video coding and decoding methods for audiovisual services at the rates of $p \times 64$ Kbits/s, where p is in the range 1 to 30; the MPEG standard specifies a coded representation that can be used for compressing video sequences to bit rates around 1.5 Mbits/s; Intel's DVI video streams have a data rate of 1.2 Mbits/s or higher, depending on the desired video image quality; the successor to MPEG, known as MPEGII, is being developed to provide a wider range of functionality and image quality than its predecessor at rates in the range of 4 to 9 Mbits/s.

Two important observations can be made. The first is that the volume of bits corresponding to a video segment of useful duration is large. A ten minute DVI video segment corresponds to 90 Mbytes. Ten hours correspond to over 5 Gbytes. Thus, video servers for use in systems where shared video information is to be stored must be of relatively high capacity.

The second observation is that the transmission of video data at a certain data rate over a Local Area Network requires the provision of a channel of the same data rate on a continuous basis so as to achieve timely delivery of the data. To support the transmission of multiple independent video streams in a local area environment would require a network which can guarantee the bandwidth required for each video stream, and which has an aggregate bandwidth exceeding that required for the maximum configuration expected.

A typical local area environment comprises a number of user stations connected into a local area network by a shared transmission channel. A network may be viewed as one or more interconnected network segments which each have a shared transmission medium, for physically implementing the shared transmission channel, and one or more stations connected thereto. Data organized into packets may be transmitted on the shared transmission medium according to one of a number of protocols such as Ethernet (IEEE 802.3), token bus (IEEE 802.4), token ring (IEEE 802.5), or FDDI (ANSI X3T9.5). Application programs executed at each station may generate one of at least two types of data: bursty transactional data and stream-oriented video or audio data.

A typical station 10 used in a local area network is shown in FIG. 1. The station 10 is connected to a shared medium 28 of a network segment. The station 10 has a bus 12 to which a CPU 14, a main memory 16 and a disk memory 18 are connected. In addition, an I/O device 20 is connected to the bus 12 which illustratively includes a display device 22, such as a cathode ray tube (CRT) terminal, and a keyboard 24. A network interface circuit 26 connects the bus 12 to the shared transmission medium 28 of the network. The network interface circuit 26 receives data from the bus 12 (e.g., originating from the CPU 14, main memory 16, disk memory 18, I/O device 20, etc.) for transmission over the shared transmission medium 28. In addition, the network interface circuit 26 receives data destined to the station 10 from the shared transmission medium and transmits this data onto the bus 12 (to, e.g., the CPU 14, main memory 16, disk memory 18, I/O device 20, etc.).

The transfer of data between the station 10 and the shared transmission medium 28 may be illustrated using functional layers. As depicted in FIG. 2, the highest layer contains a communication protocol stack including one or more protocols. Illustratively, a protocol is provided for each type of data transmitted and received by the station. The protocol organizes data of the corresponding type into data packets to be transmitted from the station. Similarly, the protocol extracts data of a corresponding type from a received packet.

Associated with each protocol is a queue. Each queue is for storing different types of data packets, such as video data packets and transactional data packets. On the next level, a multiplexer maintains the packets in a corresponding queue of the stack and appropriately multiplexes the packets generated by the various stacks onto a single service access point of the next layer. Conversely, the multiplexer also appropriately dispatches the packets arriving from the access point to the various protocol stacks. Illustratively, the protocol stack, queues and multiplexer may be implemented in the CPU 14 (and, for instance, the main memory 16 and/or disk memory 18) which executes appropriate instructions for performing the respective functions.

The next layer includes a media access controller (MAC). The MAC layer provides access for packets to and from the shared transmission medium. The MAC layer illustratively includes the network interface circuit 26 and appropriate software for implementing a protocol for sharing the shared transmission medium with other stations, such as Ethernet, token ring, token bus, or FDDI. These MAC protocols are briefly examined below as to their ability to differentiate between different types of traffic.

1) IEEE 802.3 (Ethernet)

IEEE 802.3 is devised for a passive bus network structure. It has no concept of traffic types nor priorities. The access algorithm works as follows. Consider a station with a packet scheduled for transmission at a point in time t. If the station senses the channel idle at time t, it initiates the transmission of the packet. If the station senses the channel busy at time t, it monitors the channel until the end-of-carrier appears, and then, following a period of time called the interframe gap, it initiates the transmission of the packet.

Either the transmission of the packet is not interfered with, in which case it is transmitted successfully, or a collision with another packet is detected. In such a case, the transmission of the packet is aborted and the packet is rescheduled for transmission according to a truncated exponential backoff algorithm.

The truncated exponential backoff algorithm is as follows: Consider a station which has just incurred its $n^{th}$ collision, $n=1,2,...,15$. Let $t_n$ denote the time when the end-of-carrier corresponding to the collision period is detected. The station reschedules the packet for transmission at the time $t_n + ks$, where k is an integer selected uniformly in the range $[0, 2^{min\{n,10\}} - 1]$ and s denotes the slot size. (The slot size must be greater than the maximum roundtrip delay in the network, and has a default value of 51.2 microseconds, or equivalently 512 bit times.) At the $16^{th}$ collision, the station stops attempting transmission of the packet.

2) IEEE 802.5 (Token ring)

IEEE 802.5 is a token protocol devised for a ring network. It uses a single token, in the sense that a station that has completed transmission will not issue a new token until the busy token returns to it. Contrary to bus type networks which are passive networks, a ring network is active in the sense that a station's tap is a powered device which regenerates the signal it is relaying. Similarly, a tap is capable of modifying the signal it is relaying. Using this capability, this scheme offers priority access to packets by dynamically assigning a priority value to the token, and by restricting access to the ring to packets of priority equal or higher than the currently assigned value. Restricting the scheme to a single token, while not as efficient as using multiple tokens, simplifies priority and error recovery functions.

3) IEEE 802.4 (Token bus) and FDDI

IEEE 802.4 is devised for a passive bus network in which stations form a logical ring, and use a token passing scheme for access control purposes. The bus, being passive in nature, prevents the use of a prioritized token scheme such as IEEE 802.5. Instead, a timer based access control scheme is employed as described below in detail.

FDDI is a ring network which uses a token passing scheme as well. Since it is a higher bandwidth network in comparison to IEEE 802.5, the scheme could not be restricted to a single token, as this would severely limit the throughput of the network. Thus, a priority access scheme similar to IEEE 802.5 cannot be envisioned. Instead, the timer based access control scheme introduced in IEEE 802.4 is employed.

Both IEEE 802.4 and FDDI differentiate among different types of traffic, and place a limit on the period of time that a station may spend transmitting packets of a given type. More explicitly, eight service classes are defined, labeled 0 through 7 (the higher the label, the higher the priority). (Note that IEEE 802.4 limits the number of classes to 4, numbered 6,4,2,0, with class 6 handled in the same manner as class 7 in FDDI. All other classes in both schemes are otherwise handled in the same manner.) Within a station, each access class acts as a virtual substation in that the token is passed internally from one class to the next, in the order 7,6,5 etc. A time parameter called the token hold time (THT) is assigned to class 7. Each of the other 7 classes is assigned a parameter called the target token rotation time ($TRT_i$, where $i=6,5,...,0$). When a station first receives the token, it transmits consecutive packets of class 7 until it has transmitted all such packets, or a period of time equal to THT has elapsed, whichever comes first. For the other classes, the corresponding virtual substation measures the token circulation time, i.e., the time it took the token to return since the last visit to that substation. If the token returned in less than its TRT, then the substation transmits packets of that class until all such packets are transmitted or a period equal to the difference between its TRT and the measured token circulation time has elapsed, whichever comes first; otherwise, the station passes the token to the next substation immediately. The philosophy behind this scheme is clear: upon reception of the token, each station is guaranteed a transmission quota equal to THT for class 7. However, data packets of lower classes can gain access only if the token returns in a period of time below a given threshold. Obviously, if the total transmission time of class 7 data packets in a token cycle exceed all the TRT's, then all lower classes cannot use the channel at all, yielding to the highest priority class 7 traffic. The intention behind the cycle-dependent timing mechanism is that, as the load of class 7 reduces, lower class packets are allowed to access the channel successively starting from the access class with the largest TRT down to the one with the smallest TRT. Note that it can be shown that this cycle-dependent timing mechanism limits the token circulation time at or below twice the largest TRT, provided that the sum of all the THT's for all stations is less than the largest TRT. As a result one can control the access delay at each substation by appropriately setting the largest TRT. This implies that one can support real-time traffic, such as packetized video, as class 7 traffic, while allowing other traffic to share the excess bandwidth. It can also be shown that a class lower than 7 with a larger TRT gets a larger share of the channel bandwidth; and that, depending on the relative values of the TRT's, it is possible for certain classes to be deprived of service.

Each of the aforementioned MAC layer protocols is disadvantageous. The IEEE 802.3 (Ethernet) is very popular and widely deployed, but does not support any prioritization of the different types of transmitted data. Furthermore, most network implementations based on IEEE 802.4 (token ring), IEEE 802.5 (token bus) and ANSI X3T9.5 (FDDI) do not make use of the above-mentioned packet access control or station transmission ordering functions specified in the standards. Thus, most existing networks are incapable of properly allocating bandwidth of the shared transmission channel for delivering streamed video data in a continuous and timely fashion to its destination.

It is therefore an object of the present invention to provide for timely delivery of video data without requiring significant changes to the hardware of the communications network. In particular, it is an object of the present invention to adapt a network so that, according to a station transmission ordering, each station enables packets to access a shared transmission medium according to an packet access control scheme so as to guarantee bandwidth of the shared transmission medium to particular types of packets, such as video, without modifying the stations' hardware.

SUMMARY OF THE INVENTION

These and other objects are achieved by the present invention which provides a method and system for allocating bandwidth in a network between first and second types of data. In accordance with a first embodiment, a station is provided which is connected to a shared transmission medium of a network segment. The station includes one or more protocol stacks for processing the first and second types of data packets. A queue is associated with each protocol for storing corresponding packets. The station is also provided with a media access controller (MAC), which is unable to differentiate among the different types of packets. The MAC is provided for enabling data packets of the different types stored in the queues to access the transmission medium. A throttler is also provided for controlling the submission of packets from the queues to the MAC, depending on the type of the packets, to provide an appropriate amount of bandwidth to, and to limit the access delay of, one or more particular types of data packets in the shared transmission medium.

Illustratively, the throttler submits packets to the (MAC) in accordance with a time based access control scheme, such as specified in IEEE 802.4 (token bus) or ANSI X3T9.5 (FDDI). According to such schemes, the throttler submits certain kinds of packets only at particular times. Furthermore, the throttler delays submitting any packets to the MAC until the media access controller receives a token packet from the transmission medium.

Illustratively, the first type of packets contain video data and the second type of packets contain transactional data. The station according to the first embodiment thus ensures that video data is delivered to its destination in a continuous and timely fashion.

Often, it is also desired to transmit streamed data, such as video, on a network having some stations adapted to include a throttler and one or more conventional stations which do not include a throttler. This presents a problem because the conventional stations do not differentiate between different types of packets or observe any station transmission ordering. Instead, these stations continually attempt to transmit any backlogged packets they may have on the shared medium. Such stations may "flood" the shared transmission medium with their packets, thus preventing other stations from obtaining sufficient bandwidth for their high priority (e.g., video) packets. According to a second embodiment of the invention, a network adapter is provided for interconnecting a shared transmission medium of a network segment and a conventional station. The network adapter has a first conventional MAC for receiving packets from and transmitting packets and other signals to the station. The network adapter also has a second conventional MAC for enabling data packets received from the first MAC to access the transmission medium. Furthermore, the network adapter has a throttler for controlling the submission of packets received from the first (station side) MAC to the second (shared transmission medium side) MAC depending on the type of the packets. At times, the throttler may suspend the submission of packets to the second MAC altogether so as to permit the transmission of data packets not originating at the station (e.g., data packets originating at another station connected to the shared medium) in the shared transmission channel. Furthermore, the throttler may also control the transmission of packets from the station through the network adapter in one of two ways. For instance, the throttler may submit a signal for transmission from the first MAC, such as a packet which collides with a packet transmitted from the station, or an artificial carrier signal. In either case, the station inhibits transmitting its packet. Alternatively, or additionally, the network adapter may be provided with a buffer for temporarily storing packets received from the first MAC. Thereafter, the throttler may submit the packets from the buffer to the second MAC at the appropriate time so that a certain amount of bandwidth of the shared medium is guaranteed for packets of the first type (e.g., video).

In short, the present invention effectively allocates bandwidth on a shared transmission medium so that data of a particular type, i.e., streamed video or audio data, may be transmitted in a timely fashion with little or no modifications to the hardware of existing stations. The present invention also provides for interconnecting both stations adapted according to the present invention and non-adapted conventional stations while still ensuring that sufficient bandwidth is allocated to a particular type of data.

DETAILED DESCRIPTION OF THE INVENTION

Figure 1:
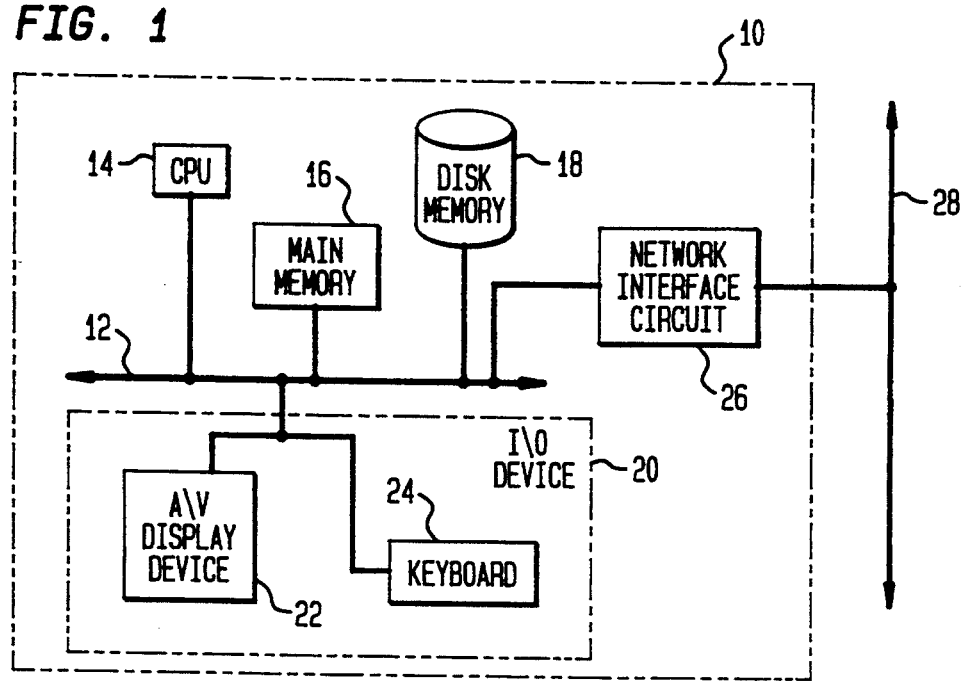
FIG. 1 shows a station which is connected to a shared transmission medium by a standard network interface circuit.
Figure 3:
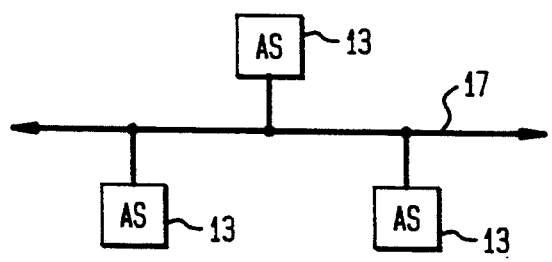
FIG. 3 depicts a network segment according to a first embodiment of the present invention.

FIG. 3 depicts a network segment according to the present invention having at least one station 13 connected to a shared transmission medium 17. As shown in FIG. 1, the network segment is connected according to a bus topology. However, a ring or star topology is also possible.

Figure 2:
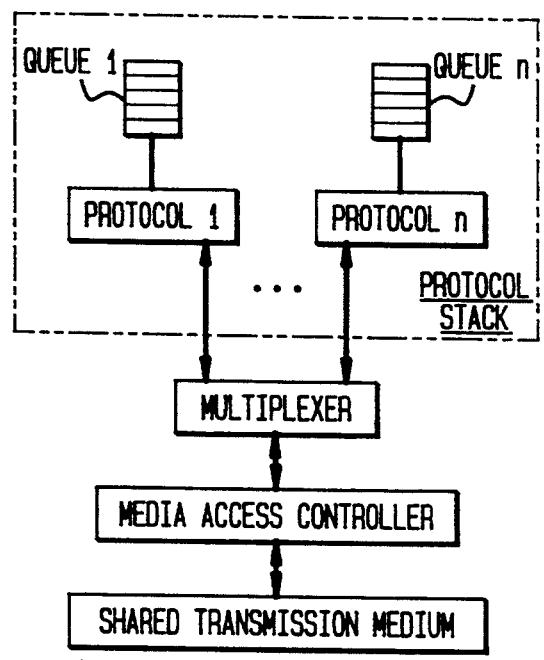
FIG. 2 is a functional layer diagram which illustrates the transfer of data between a station and a shared transmission medium.

Each station comprises a configuration as shown in FIG. 1. Furthermore, the stations 13 may transmit packets to and receive packets from the shared transmission medium 17 as illustrated in FIG. 2. The stations may transmit data packets of different types such as stream oriented video or audio data or bursty transactional data packets. In a conventional station 13, packets of all types are submitted to the MAC layer which transmits them ad hoc, i.e., in an arbitrary order. Furthermore, if the station 13 has backlogged packets to transmit, it continuously attempts to transmit these packets of each type whenever possible. Thus, it is possible that at a particular station, data packets, such as video data packets, experience long delays in accessing the shared transmission medium. These access delays may be so long that the data packets do not arrive at their destination in a timely fashion.

According to a first embodiment of the present invention, each station is provided with a throttler. The throttler selectively controls the submission of packets from the queues to the MAC layer. The throttler may be a special logic circuit, e.g., a processor connected to the bus 12 (FIG. 1), which is dedicated to the function of submitting packets to the MAC layer. Preferably, however, the throttler merely comprises hardware already provided at the station, e.g., the CPU 14 (FIG. 1), which executes a process for controlling the submission of packets to the MAC layer.

The throttler according to the first embodiment submits different types of packets to the MAC only during an appropriate time for submitting such types of packets. Furthermore, the throttler may suspend submission of packets from the queues altogether under certain conditions so that another station may transmit packets. Illustratively, the throttler implements the time-based access control algorithm specified in the IEEE 802.4 (token bus) or the ANSI X3T9.5 (FDDI) standards. In the implementation, a single control packet is used as the token. This packet is circulated from station to station via the shared transmission medium 17. If a station receives the token packet, it may submit packets to the MAC layer for transmission onto the shared transmission medium 17 according to a time controlled access scheme which is discussed below. However, the throttler of the station which received the token packet suspends submitting packets to the MAC layer if one of two events occur: (i) the station transmits all of its packets, or (ii) according to the time controlled access scheme, the time for transmitting packets expires. In addition, if one of these two events occur, the throttler submits a token packet to the MAC layer for transmission to the next station connected to the segment according to some predetermined token passing order.

Figure 4:
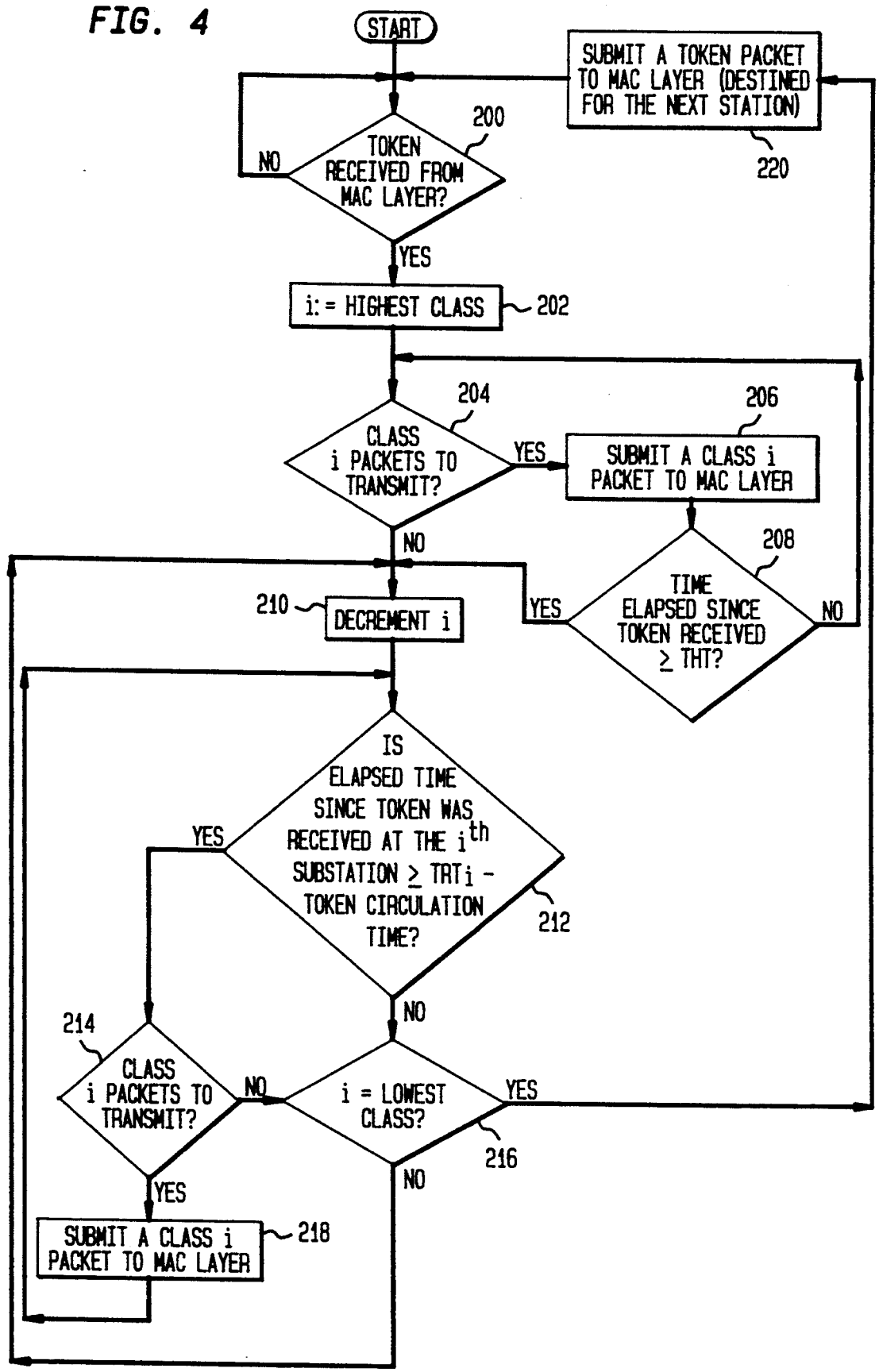
FIG. 4 schematically illustrates a token passing process executed by a station adapted according to the embodiment of the invention depicted in FIG. 3.

FIG. 4 schematically depicts a flow chart which illustrates the process executed by the throttler. Initially, as shown by step 200, the throttler determines if the MAC layer has received a token packet. This token packet is transmitted to the station from another station via the shared transmission medium 17. Illustratively, the stations pass the token packet from one station to the next according to a predetermined ordering. If the token packet was not received by the MAC layer, the throttler re-executes step 200. It may be appreciated that the throttler repeatedly re-executes step 200 until the token packet is received. During this time, no token packets are submitted to the MAC layer. When the token packet is received, execution in the throttler continues with step 202.

In step 202 an index i is set equal to the highest class. Illustratively, according to FDDI, the classes are ordered numerically from 7 to 0 with 7 being the highest priority class and 0 being the lowest priority class. Similarly, according to IEEE 802.4, the classes are numbered 6, 4, 2, 0 with 6 being the highest priority class and 0 being the lowest priority class.

Next, execution in the throttler proceeds to step 204, wherein the throttler determines if it has any packets of the class i (i.e., the highest class) to transmit. If such packets exist, execution in the throttler proceeds to step 206. Otherwise, execution proceeds to step 210.

In step 206, the throttler submits a class i packet to the MAC layer for transmission on the shared transmission medium 17. Next, in step 208, the throttler determines if the time elapsed since the token packet was received is greater than or equal to the THT or token hold time parameter. Illustratively, every station provided with a throttler assigns a THT parameter to its packets of the highest class. The THT time parameter may vary from station to station. If this time period has not expired then execution returns to step 204. Otherwise, execution in the throttler proceeds to step 210. Alternatively, the station may limit the total number of packets transmitted, rather than using a time limit.

Thus, it may be appreciated that the throttler repeatedly executes steps 204-208 until one of two events occur: (i) there are no more packets of the highest priority class to transmit, or (ii) the elapsed time since the token was received equals or exceeds the THT parameter. This scheme ensures that each station is guaranteed at least a time THT to transmit packets of the highest priority.

In the case that there are no packets of the highest priority class to transmit, or the elapsed time since the token was received exceeds the THT parameter, the throttler executes step 210. Therein, the index i is accordingly decremented so that it indicates the class of the next highest priority. (If the throttler operates according to FDDI, i is decremented by one. If the throttler operates according to IEEE 802.4, i is decremented by two.) In certain cases, it may be desired to provide only two classes, e.g., a higher priority class for streamed data and a lower priority class for transactional data. Higher priority class packets would be submitted to the MAC using steps 204-208 as discussed above and lower priority packets would be submitted to the MAC as discussed below.

In the series of steps 212-218, the throttler determines whether or not to transmit packets of lower priority classes. According to ANSI X3T9.5 or IEEE 802.4, each class below the highest priority class is treated as a separate virtual substation. Each substation is assigned a target token rotation time or $TRT_i$ which fixes the allotted time, as described in IEEE 802.4 or ANSI X3T9.5, for transmitting packets in the corresponding class i. If the elapsed time since the substation received the token is less than the difference between $TRT_i$ and the token circulation time (i.e., the difference between the time the substation received the token, and the previous time that the substation received the token), then packets of the corresponding priority class i may be submitted to the MAC layer. Otherwise, the token is passed immediately to the substation of the next lower priority class. This scheme ensures that each class is allocated a period of time equal to the $TRT_i$ less the token circulation time for transmitting packets, provided the token circulation time is less than $TRT_i$.

In step 212, the throttler determines if the elapsed time since the token was received at the $i^{th}$ substation is greater than or equal to the $TRT_i$ associated with the particular class indicated by the index i, less the token circulation time. If not, then the throttler proceeds to step 216. Otherwise, the throttler executes step 214. In step 214, the throttler determines if there are any class i packets to transmit. If not, then the throttler executes step 216. If there are class i packets to transmit, the throttler executes step 218 wherein a class i packet is submitted to the MAC layer. Thereafter, execution returns to step 212.

In step 216 (which the throttler executes in the case that there are no packets of the class i or if the allotted time for transmitting class i packets, as fixed by the $TRT_i$ parameter, has expired) the throttler determines if the lowest priority class has been reached (i.e., if i=0). If so, then the throttler executes step 220. Otherwise, execution in the throttler loops back to step 210 where i is decremented and the sequence of steps 212-218 is executed for the next lowest priority class of packets.

In step 220, the throttler submits the token packet to the MAC layer for transmission to the next station on the segment according to a predetermined token passing scheme. Thereafter, the throttler proceeds to step 200. Once again, the throttler re-executes step 200 repeatedly until the MAC layer once again receives the token packet from a preceding station.

In the above process, video data may be assigned to the class of the highest priority (e.g., 7 as specified in the ANSI X3T9.5 standard, or 6 as specified in the IEEE 802.4 standard). Other types of data, such as transactional data, would be assigned to classes of lower priority. Thus, each station would be guaranteed a certain amount of time (i.e., THT) for transmitting video data. Furthermore, the delay experienced by video data packets in accessing the shared medium is reduced, thereby permitting video data packets to be transmitted in a continuous and timely fashion. It may be appreciated that the above process works equally well if the station is not capable of transmitting certain types of packets, such as video data packets. Nonetheless, regardless of the types of packets generated at the station, packets are only transmitted at the appropriate time depending on their class.

The time based access control algorithm in the above token passing scheme is merely illustrative. A token passing scheme may be implemented wherein the throttler allocates bandwidth in the shared transmission channel to different types of packets in other ways. In one scheme, the throttler controls the amount of data of each type submitted to the MAC layer. For instance, it may be desirable to permit the stations to transmit all of their video data packets (without any other restriction) followed by transactional data packets up to a certain maximum number. Alternatively, the number of transactional data packets submitted to the MAC layer is limited such that the total duration of data packet transmissions does not exceed a specified maximum period of time. In another modification to the above process, the throttler alternates between two or more different kinds of cycles. For example, the throttler may submit only video data packets during odd cycles (odd numbered visits of the token packet to the station) and only transactional data packets on even cycles (even numbered visits of the token packet to the station). Illustratively, in this modified process, a limit is placed on a cycle such that the total length of the previous cycle (e.g., a video data cycle) and the current cycle (e.g., a transactional data cycle) does not exceed a certain prespecified duration. In yet another illustrative modified process, priority is given to video data packets, as before, but the amount of transactional data transmitted is controlled according to a rate control scheme. It may be appreciated that any number of other data packet allocation schemes may be implemented in accordance with the first embodiment by using a token passing process.

It is also possible to sequence the transmission of packets from the stations as above without having the stations pass a token from one station to the next. Instead, a single network control device connected to the shared transmission medium, such as a station, switching hub, bridge, router, port, server or other network device, polls each station on the network segment. In other words, the network control device selects one station at a time (according to some ordering) and permits that station to transmit packets. Alternatively, or in addition to the above, any of the parameters used to control access of different types of data packets may be varied dynamically to match loading conditions.

The above embodiment advantageously controls the transmission of data packets by stations which are specially adapted with throttlers. Often, however, it is desirable to transmit video packets on networks or network segments having one or more conventional stations which are not adapted with throttlers. For example, it may be desirable to transmit packets on a network segment having several stations connected to a shared medium including one or more stations provided with throttlers and one or more conventional stations without throttlers. Alternatively, it may be desired to transmit packets between a segment having only stations with throttlers and a segment having at least one conventional station without a throttler.

If a conventional station is connected directly to a shared transmission medium, to which stations with throttlers are also connected, it will disrupt the transmission ordering observed by the stations which are adapted with throttlers. This is because the conventional station continuously attempts to transmit any backlogged packets it may have (in an arbitrary order). Such a station may "flood" the shared transmission medium with packets thus preventing other stations from obtaining sufficient bandwidth for their high priority packets.

Figure 5:
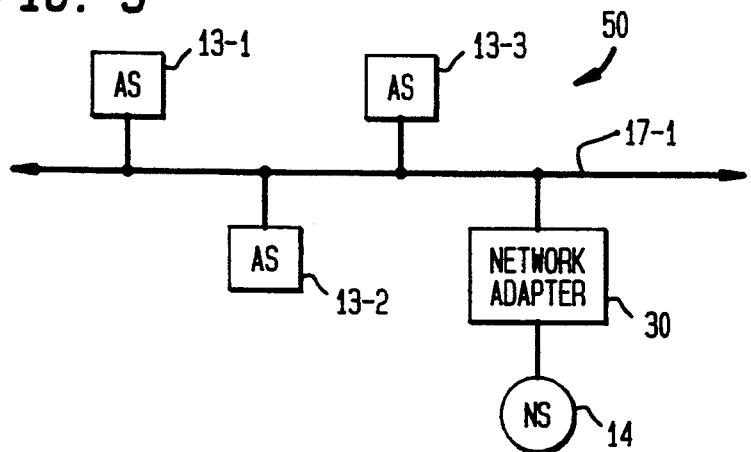
FIG. 5 depicts a conventional non-adapted station connected to the shared transmission medium of a network by a network adapter according to a second embodiment of the present invention.

A conventional station may be connected according to a second embodiment of the present invention to a network segment so that it does not disrupt the transmission ordering observed by the stations adapted with throttlers. FIG. 5 illustrates an exemplary configuration for connecting a conventional station 14 to a network segment 50. The network segment 50 has stations which are provided with throttlers 13-1, 13-2 and 13-3 connected to a shared medium 17-1. However, at least one non-adapted station 14 is also provided in the network segment 50. A network adapter 30, according to a second embodiment of the present invention, is provided which is connected to the station 14 and the shared medium 17-1.

Figure 6:
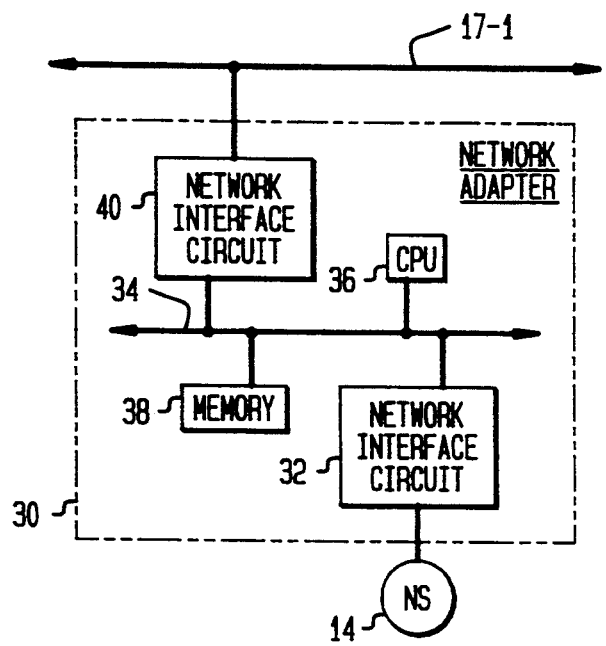
FIG. 6 illustrates the network adapter of FIG. 5 in greater detail.

FIG. 6 depicts the network adapter 30 in greater detail. As shown, the network adapter 30 has a network interface circuit 32 connected to the station 14. This network interface circuit 32, in turn, is connected to a bus 34. In addition, a CPU 36, a memory 38 and a second network interface circuit 40 are connected to the bus 34 so that they may communicate with one another. The second network interface circuit 40, is also connected to the shared medium 17-1.

The operation of the network adapter 30 may be illustrated using layers. The network adapter is provided with two MACs. The first MAC provides access for packets to and from the station 14. Illustratively, the first MAC comprises the network interface circuit 32. The second MAC provides access for packets to and from the shared transmission medium 17-1. Hence, the second MAC illustratively comprises the network interface circuit 40.

The network adapter 30 is provided with a throttler for ensuring that the station 14 does not disrupt the transmission ordering followed by the adapted stations 13-1, 13-2 and 13-3. Illustratively, the throttler comprises the CPU 36 which executes an appropriate process for controlling the submission of packets between the first and second MACs 32 and 40.

In operation, the network adapter 30 acts as a virtual station which observes the same station transmission ordering and packet access control scheme observed by the stations 13-1, 13-2 and 13-3. The throttler of the network adapter 30 thus illustratively carries out one of the aforementioned station ordering and packet access control schemes (e.g., as described in IEEE 802.4, ANSI X3T9.5, etc.) so that packets of a certain type, e.g., video data packets, are guaranteed a certain amount of bandwidth of the shared transmission medium 17-1. To that end, the throttler submits packets of a particular type received from the first MAC 32 to the second MAC 40 for transmission on the shared medium 17-1 only at the appropriate time for transmitting packets of that type. Furthermore, the throttler suspends submission of packets altogether at times according to the transmission ordering observed by the stations 13-1, 13-2 and 13-3. As such, the network adapter 30 effectively isolates the conventional station 14 from the network segment 50 so that it is unable to disrupt the station transmission ordering of the stations 13-1, 13-2 and 13-3. It is also possible that the station 14 is only capable of transmitting (and/or receiving) certain types of packets (e.g., only transactional data packets). Nonetheless, such packets are submitted to the second MAC 40 only at an appropriate time for transmitting such packets.

The submission of packets between the first and second MACs 32 and 40 may be controlled in a number of ways. For instance, packets, which may be arbitrarily transmitted from the first station (and received by the first MAC 32) from time to time, may be temporarily stored in a buffer until an appropriate time for submission to the second MAC 40. Illustratively, the buffer comprises the memory 38.

In the alternative, or in addition to, storing the packets received from the station 14 via the first MAC 32, the throttler controls the transmission of packets from the station 14 to the first MAC 32. This is particularly desirable if storage space in the buffer is limited. The transmission of packets may be controlled in a number of ways. For instance, according to a first process, the throttler intentionally causes collisions with packets transmitted by the station 14. In other words, the throttler submits a packet to the first MAC 32 for immediate transmission to the station 14 while the station 14 is transmitting a packet so that the two packets collide. The station 14 detects the collision and, in response, reschedules transmission of its packets for a later time. For example, if the station 14 transmits packets according to the IEEE 802.3 protocol, it delays the transmission of its packet according to the truncated exponential backoff algorithm.

Bandwidth of the shared medium 17-1 may be allocated specifically to video packets by controlling the number of consecutive collisions inflicted on each packet transmitted by the station 14. As an illustration, assume the station 14 transmits packets according to the IEEE 802.3 protocol (which employs the truncated exponential backoff algorithm) of maximum size (e.g., 1500 bytes). The station's throughput may be limited to no more than 15% of the total bandwidth of the shared medium 17-1 by inflicting 7 consecutive collisions on each packet transmitted by the station 14. If 8 consecutive collisions are inflicted on each packet, the station 14 is allocated no more than 8% of the total bandwidth; if 9 consecutive collisions are inflicted on each packet, the station 14 receives up to 4% of the bandwidth. The average delay experience by packets transmitted from the station 14 is approximately 7 msec if the station receives 15% of the bandwidth, approximately 13 msec if the station receives 8% and 26 msec if the station receives 4%.

In an alternative process for controlling the transmission of packets from the station 14, the throttler intentionally causes the first MAC 32 to transmit an artificial carrier signal to the station 14. The station 14 inhibits the transmission of its packet until it no longer senses the artificial carrier signal. The throttler controls the rate at which traffic enters the shared transmission medium 17-1 from the station 14 by appropriately choosing the period of time during which the artificial carrier signal is generated. In the meantime, the throttler is capable of permitting the other stations 13-1, 13-2 and 13-3 to transmit packets on the shared transmission medium 17-1 and the station 14 to receive packets therefrom.

Furthermore, in either of the above processes, the throttler may adjust the number of collisions (or the period in which the artificial carrier signal is generated) as a function of information pertaining to the number of received packets which are temporarily stored in the buffer of the network adapter 30, e.g., the buffer content, the burst length (if known), etc. According to this modification, packets are accepted from the station 14, without delay as long as the memory 38 is not full.

Figure 7:
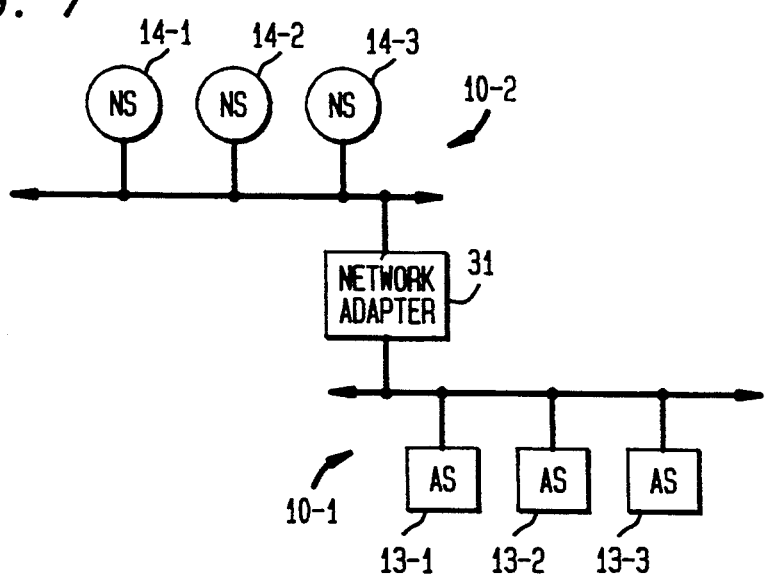
FIG. 7 depicts a network segment having only stations adapted according to the present invention connected by a network adapter to a network segment having several conventional non-adapted stations.

FIG. 7 shows another network 60 having a network adapter 31 according to the second embodiment. The network 60 includes two network segments 10-1 and 10-2 connected together by the network adapter 31 which also functions as a bridge. It may be appreciated that network devices, such as bridges, routers, hubs, servers, stations, ports, etc., may be simply adapted so that they additionally carry out the functions of the throttler.

As shown in FIG. 7, in the network segment 10-1, the adapted stations 13-1, 13-2 and 13-3 are connected to a shared medium 17-1. In the network segment 10-2, the non-adapted stations 14-1, 14-2 and 14-3 are connected to the shared medium 17-2. The network segments 10-1 and 10-2 are shown having bus topologies. However, it may be appreciated that other topologies, such as ring or star topologies, are possible. The network adapter 31 interconnects the two shared mediums 17-1 and 17-2 in a manner such that the stations 14-1, 14-2 and 14-3 do not interfere with the transmission ordering observed by the stations 13-1, 13-2 or 13-3. Illustratively, the network adapter 31 has a throttler which operates as discussed above in the case of a network having only a single conventional station without a throttler.

Finally, the above discussion is intended to be merely illustrative of the invention. Numerous other embodiments may be devised by those having ordinary skill in the art without departing from the spirit or scope of the following claims.

We claim:

1. A station connected to a network having a shared transmission medium for transmitting and receiving first and second types of data packets having different priorities, comprising:
    a memory for maintaining a plurality of queues, including one queue for each type of data packet, for storing the corresponding data packets,
    a media access controller, which is unable to differentiate among said first and second types of data packets having different priorities, for enabling said first and second types of data packets stored in Said queues of said memory to access said transmission medium, and
    a CPU in communication with said memory and said media access controller, and separate from said media access controller, for maintaining one or more protocols for processing said first and second types of data packets, for determining priority of the data packets and for executing a throttling algorithm for controlling the submission of data packets based on said determined priority from said queues to said media access controller depending on the type of data packets, to provide an appropriate amount of bandwidth to, and to limit an access delay of said first type of data packets in said shared transmission medium.

2. A station connected to a network having a shared transmission medium for transmitting and receiving a first type of data packet and one or more other types of data packets having different priorities, comprising:
    at least: one protocol stack containing a plurality of protocols including one for processing each of said first and said other types of data packets,
    a plurality of queues including a queue for each protocol for storing corresponding data packets,
    a media access controller, which is unable to differentiate among said first type and said other types of data packets having different priorities stored in said queues to access said transmission medium with arbitrary priority, and
    a throttler, separate from said media access controller, for ascertaining priority of the data packets and for controlling the submission of said first and said other data packets from said queues to said media access controller depending on said ascertained priority and the types of data packets, to provide an appropriate amount of bandwidth to and to limit an access delay of said first type of data packets in said shared transmission medium.

3. The station of claim 2 wherein said throttler suspends submitting said data packets altogether for certain periods of time so that other data packets not originating at said station may be transmitted in said shared transmission medium.

4. The station of claim 2 wherein said throttler delays submitting any data packets to said media access controller until said media access controller receives a token packet from said transmission medium.

5. The station of claim 4 wherein if said throttler receives said token packet, said throttler submits data packets of said first type to said media access controller so long as a period of elapsed time since said token packet was received is less than or equal to a predetermined token hold time parameter, and
    wherein, said throttler submits data packets of each other type to said media access controller for a period of time up to the difference between a predetermined target token rotation time parameter associated with said submitted type of data packets and a token circulation time.

6. The station of claim 5 wherein said token rotation time parameter and said token hold time parameter vary dynamically to match loading conditions.

7. The station of claim 5 wherein, if said period of time for transmitting each type of data packet expires, said throttler submits said token packet to said media access controller for transmission on said shared transmission medium to another station which is selected according to a predetermined ordering of stations.

8. The station of claim 4 wherein the throttler submits any data packets of said first type and up to a certain maximum number of data packets of said types other than said first type to said media access controller when said token is received.

9. The station of claim 8 wherein said maximum number varies dynamically to match loading conditions.

10. The station of claim 4 wherein the throttler submits any data packets of said first type and data packets of said types other than said first type to said media access controller when said token is received provided that the total time during which data packets of each type are transmitted does not exceed a certain maximum time limit.

11. The station of claim 10 wherein said maximum time limit varies dynamically to match loading conditions.

12. The station of claim 4 wherein said throttler alternatively submits data packets of said first type, but not said one or more other types, to said media access controller and data packets of said one or more other types, but not said first type, to said media access controller depending on whether said throttler received said token an even or odd number of times and wherein said throttler submits no more than a prespecified total number of data packets of said first and said one or more other types every two times that said token is received.

13. The station of claim 12 wherein said prespecified total number varies dynamically to match loading conditions.

14. The station of claim 4 wherein said throttler submits any data packets of said first type and up to a certain number of data packets of types other than said first type to said media access controller provided that the ratio of submitted data packets of said other types to submitted data packets of said first type is less than a prespecified ratio.

15. The station of claim 14 wherein said prespecified ratio varies dynamically to match loading conditions.

16. The station of claim 2 wherein said throttler is formed by a CPU.

17. The station of claim 2 wherein said media access controller comprises a network interface circuit.

18. The station of claim 2 wherein said first type of data packets is video data and one or more other types of data packets is transactional data.

19. A network segment comprising:
   a shared transmission medium, and
   at least one station connected to said shared transmission medium for transmitting and receiving first and second types of data packets having different priorities, comprising:
      one or more protocol stacks for maintaining first and second protocols for processing said first and second types of data packets,
      a plurality of queues including at least one queue for each protocol for storing the corresponding data packets,
      a media access controller, which is unable to differentiate among said first and second types of data packets having different priorities, for enabling said first and second types of data packets stored in said queues to access said shared transmission medium with arbitrary priority, and
      a throttler, separate from said media access controller, for determining priority of the data packets and for controlling the submission of data packets from said queues to said media access controller depending on said determined priority and the types of data packets, to provide an appropriate amount of bandwidth to and to limit an access delay of said first type of data packets in said shared transmission medium.

20. The network segment of claim 19 wherein at said at least one station said throttler suspends submitting data packets altogether for certain periods of time so that data packets not originating at said at least one station may be transmitted in said shared transmission medium.

21. A network adaptor for interconnecting a shared transmission medium of a network segment on which different types of data packets having different priorities are transmitted and a station, said adaptor comprising:
   a first media access controller, which is unable to differentiate among different types of data packets having different priorities, for receiving data packets from and transmitting data packets to said station,
   a second media access controller, which is unable to differentiate among said types of data packets having different priorities, for enabling data packets received from said first media access controller to access said transmission medium, and
   a throttler, separate from said media access controllers, for determining priority of the data packets and for controlling the submission of data packets based on said determined priority from said first media access controller to said second media access controller, to provide an appropriate amount of bandwidth to and to limit an access delay of particular types of data packets in said shared transmission medium.

22. The network adapter of claim 21 wherein said throttler submits a data packet to said first media access controller for immediate transmission to said station while said station transmits a data packet so that both data packets collide.

23. The network adapter of claim 22 wherein, in response to said collision, said station delays transmitting its data packet according to a truncated exponential backoff algorithm.

24. The network adapter of claim 21 further comprising a buffer for storing data packets received from said first media access controller.

25. The network adapter of claim 24 wherein said throttler submits data packets to cause a particular number of collisions with each data packet transmitted by said station which number depends on said data packets in said buffer.

26. The network adapter of claim 21 wherein said throttler causes said first media access controller to transmit an artificial carrier signal to said station.

27. The network adapter of claim 26 wherein said station inhibits transmitting data packets while said throttler transmits said artificial carrier signal on said shared transmission medium.

28. The network adapter of claim 26 further comprising a buffer for storing data packets received from said first media access controller.

29. The network adapter of claim 28 wherein said throttler causes said first media access controller to transmit said artificial carrier signal to said station for a particular duration of time which duration depends on said data packets in said buffer.

30. The network adapter of claim 21 wherein said first media access controller receives data packets from and transmits data packets to more than one station, and wherein said throttler controls the transmission of data packets from said more than one station to said shared medium.

31. The network adapter of claim 21 wherein said throttler delays submitting any data packets to said second media access controller until said second media access controller receives a token packet from said transmission medium.

32. The station of claim 31 wherein if said throttler receives said token packet, said throttler submits data packets of said first type to said second media access controller so long as the elapsed time since said token packet was received is less than or equal to a predetermined token hold time parameter, and wherein, said throttler submits data packets of each other type to said second media access controller for a period equal to the difference between a predetermined target token rotation time parameter associated with said type of data packets and the token circulation time.

33. The station of claim 32 wherein said token hold and target rotation parameters vary dynamically to match loading conditions.

34. The station of claim 31 wherein, if said time for transmitting each type of data packet expires, said throttler submits said token packet to said second media access controller for transmission on said shared transmission medium to a station connected thereto which station is selected according to a predetermined ordering of stations.

35. The station of claim 21 wherein said throttler suspends submitting data packets altogether for certain periods of time so that data packets not originating at said station may be transmitted in said shared transmission medium.

36. A network adaptor for interconnecting data packets between a shared transmission medium of a network segment on which different types of data packets having different priorities are transmitted and at least one station, said adaptor comprising:

a first media access controller, which is unable to differentiate among different types of data packets having different priorities, for receiving data packets from and transmitting data packets to said at least one station, a second media access controller, which is unable to differentiate among different types of data packets having different priorities, for enabling data packets received from said at least one station to access said transmission medium, and a CPU, separate from said media access controllers, for determining priority of the data packets and for executing a throttling algorithm for controlling the submission of said data packets from the first media access controller to said second media access controller depending on said determined priority and the type of data packets, to provide an appropriate amount of bandwidth in and to limit an access delay of one or more types of data packets in said shared transmission medium.

37. A station for transmitting to and receiving from a shared transmission medium of a network different types of data packets having different priorities, said station comprising:

a memory for maintaining a plurality of queues including at least one queue for storing each type of packet, a media access controller, which is unable to differentiate among said types of packets having different priorities, for enabling said packets stored in said queues to access said transmission medium, and a CPU, separate from said media access controller, for determining priority of the data packets and for executing a throttling algorithm for controlling the submission of data packets from said queues to said media access controller depending on said determined priority and the type of packet to provide an amount of bandwidth in and to limit an access delay of one or more types of data packets in said shared transmission medium.

* * * * *